(12) United States Patent
Gurram

(10) Patent No.: US 12,312,029 B2
(45) Date of Patent: *May 27, 2025

(54) MODULAR VEHICLE WITH DETACHABLE MODULES THAT EXCHANGE INFORMATION AND POWER WIRELESSLY

(71) Applicant: Vidyadhar Gurram, Bangalore (IN)

(72) Inventor: Vidyadhar Gurram, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,137

(22) Filed: Feb. 6, 2024

(65) Prior Publication Data
US 2024/0308607 A1     Sep. 19, 2024

Related U.S. Application Data

(63) Continuation of application No. 16/948,967, filed on Oct. 8, 2020, now Pat. No. 11,912,358.

(60) Provisional application No. 62/912,636, filed on Oct. 8, 2019.

(51) Int. Cl.
| | |
|---|---|
| *B60K 1/04* | (2019.01) |
| *B60K 1/00* | (2006.01) |
| *B60R 25/22* | (2013.01) |
| *B62D 63/02* | (2006.01) |
| *B62D 65/02* | (2006.01) |

(52) U.S. Cl.
CPC .............. *B62D 63/025* (2013.01); *B60K 1/00* (2013.01); *B60K 1/04* (2013.01); *B60R 25/22* (2013.01); *B62D 65/02* (2013.01)

(58) Field of Classification Search
CPC ........ B62D 63/025; B62D 65/02; B60K 1/00; B60K 1/04; B60R 25/22; B60Y 2200/126
See application file for complete search history.

(56) References Cited

U.S. PATENT DOCUMENTS 11,912,358 B2 *    2/2024   Gurram ................... B60K 1/04

* cited by examiner

*Primary Examiner* — Jason D Shanske
*Assistant Examiner* — James J Triggs
(74) *Attorney, Agent, or Firm* — Adibi IP Group, PC; Amir V. Adibi; Andrew C. Palmer

(57) ABSTRACT

A personal vehicle having quick detachable modules and wireless communication between modules. In one embodiment, a scooter is provided that has a chassis frame and a vehicle body module detachably attached to the frame chassis. The vehicle body module includes one or more batteries. The scooter also includes a rear wheel module having a hub motor detachably attached to the frame chassis, and a controller that directs power from the battery to the hub motor and wirelessly transmits data between the modules to enable vehicle operation.

20 Claims, 16 Drawing Sheets

MODULAR VEHICLE

MODULAR VEHICLE

BLOCK DIAGRAM

SCOOTER CHASSIS FRAME

SCOOTER BODY

FIRST BATTERY

SECOND BATTERY

BATTERIES ATTACHED TO SCOOTER BODY

SADDLE MOUNTED TO CHASSIS FRAME

REAR WHEEL MOUNTED TO CHASSIS FRAME

HANDLEBAR MOUNTED TO CHASSIS FRAME

FRONT WHEEL MOUNTED TO CHASSIS FRAME

CONTROLLER COMMUNICATIONS

MULTIPLE BATTERY CONFIGURATION

SINGLE BATTERY CONFIGURATION

WIRELESS DATA COMMUNICATION BETWEEN MODULES

RECEPTACLE

MATING ELEMENT

RECEPTACLE MATING OPERATION

SCOOTER WITH FOOTREST

TRANSFER POWER BETWEEN VEHICLE MODULES

COMMUNICATE INFORMATION BETWEEN VEHICLE MODULES

MODULAR VEHICLE COMPONENTS BEFORE ASSEMBLY

ASSEMBLED VEHICLE

MODULAR VEHICLE WITH DETACHABLE MODULES THAT EXCHANGE INFORMATION AND POWER WIRELESSLY

CROSS REFERENCE TO RELATED APPLICATIONS

This application is a continuation of, and claims the benefit under 35 U.S.C. § 120 from, Nonprovisional U.S. patent application Ser. No. 16/948,967, entitled "Modular Vehicle With Detachable Modules That Exchange Information And Power Wirelessly," filed on Oct. 8, 2020. U.S. patent application Ser. No. 16/948,967 claims the benefit under 35 U.S.C. § 119 from U.S. Provisional Patent Application Ser. No. 62/912,636, entitled "Personal Vehicle Having Quick Detachable Modules And Wireless Communication Between Modules," filed on Oct. 8, 2019. The subject matter of each of the foregoing documents is expressly incorporated herein by reference.

TECHNICAL FIELD

The present invention relates generally to vehicles, and in particular to vehicles having quick detachable modules.

BACKGROUND INFORMATION

The development of personal vehicles, such as electric scooters, continues to advance by incorporating high efficiency motors and high capacity batteries. Currently, significant resources are spent in the manufacture and assembly processes. However, current assembly processes are expensive, require trained technicians, and produce vehicles at a relatively slow rate.

SUMMARY

In various embodiments, a personal vehicle is provided that can be reconfigured for easy and cost-efficient manufacture and that utilizes wireless technology to simplify design and operation. For example, in one embodiment, the personal vehicle is an electric scooter that has modular components to provide a customizable vehicle, wherein many modules can be detachably attached forming a single reconfigurable vehicle. The components that perform all the functionalities of the scooter are directed by one or more controllers implemented in one or more modules. Each module has waterproof casing that encloses the electronics since waterproofing electric components is an important function in a harsh environment. Each module also has a wireless power system comprising a receiver to power the electronics of that module and wireless communication between modules.

In one embodiment, a modular vehicle is a scooter. The scooter is provided with a chassis frame and a vehicle body module detachably attached to the frame chassis. The vehicle body module includes one or more batteries. The scooter also includes a rear wheel module having a hub motor detachably attached to the frame chassis, and a controller that directs power from the battery to the hub motor and wirelessly transmits data between the modules to enable vehicle operation.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
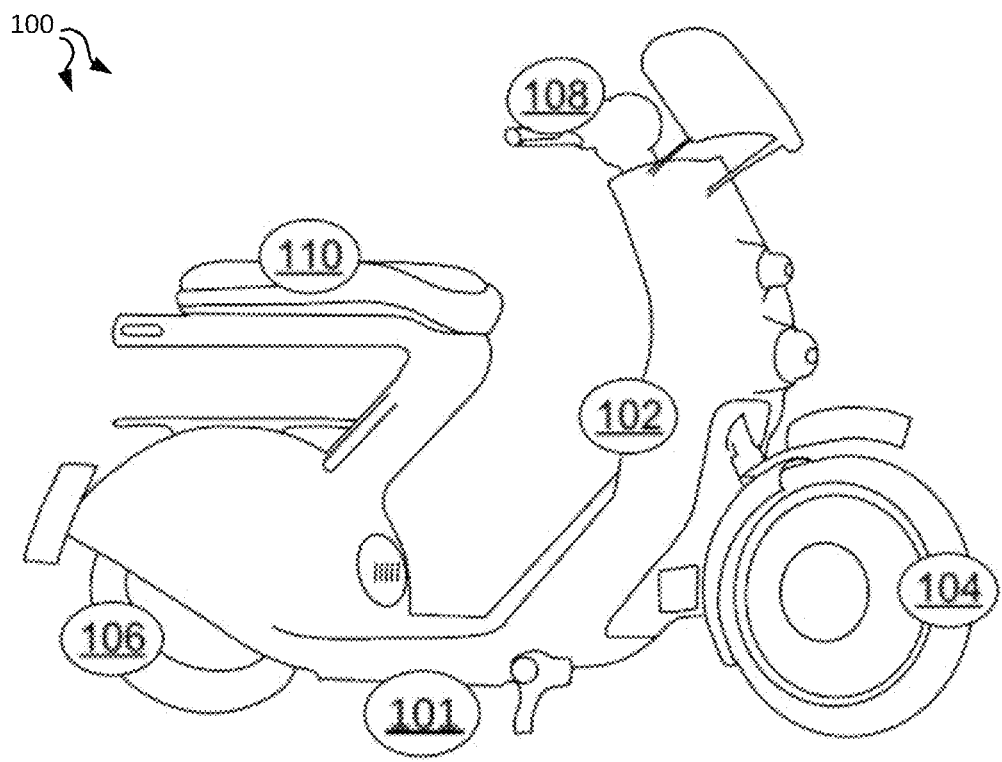
FIG. 1 is an exemplary embodiment of a modular scooter.

FIG. 1 shows an example of a modular vehicle 100. In this example, the modular vehicle 100 is a scooter that runs on battery power and is assembled from modular components.

The scooter 100 comprises a chassis frame (not visible), a battery 101, a scooter body 102, a front wheel component 104, a rear wheel component 106, a handlebar component 108, and saddle component 110. Each of the components 101, 102, 104, 106, 108, and 110 are attached to the chassis frame. In an embodiment, the rear wheel component 106 comprises an electric motor (also referred to as a hub motor) that propels the scooter.

Figure 2:
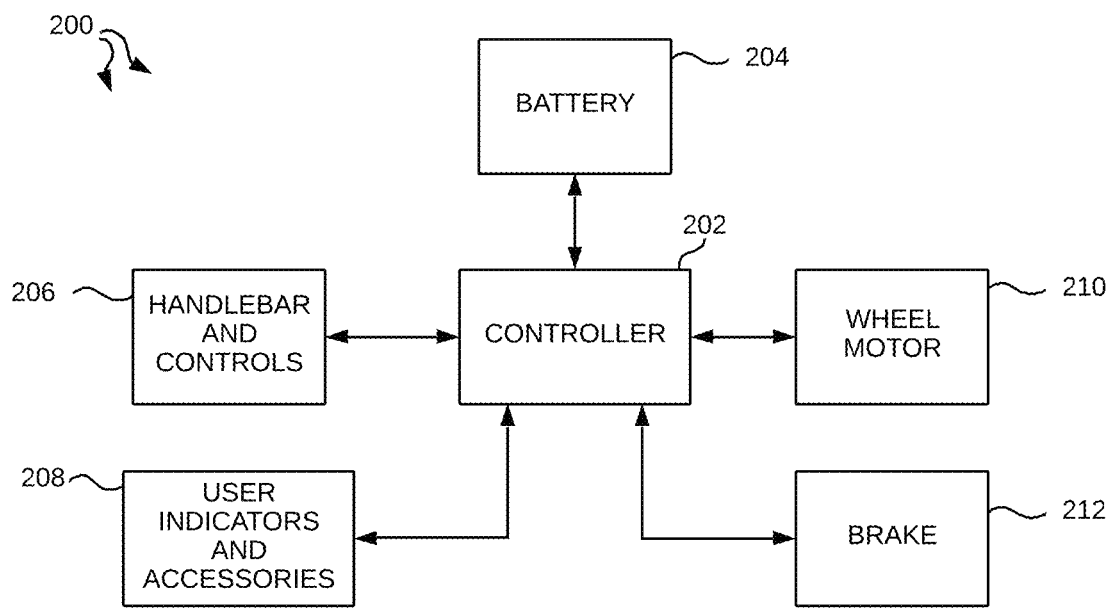
FIG. 2 shows a functional block diagram of the modular scooter shown in FIG. 1.

FIG. 2 shows a functional block diagram 200 of the scooter 100 shown in FIG. 1. In an exemplary embodiment, the functions of the scooter comprise a controller 202, battery 204, handlebar and user controls 206, user indicators and accessories 208, wheel motor 210, and brake 212.

The block diagram 200 illustrates a standard configuration of the controller 202 and associated functions. The controller 202 is the brain of the system which is connected to the various electronic parts/components and receives inputs from one or more of the components to determine signaling to be provided to the components in return. The block components may be located in different hardware components and spread across the scooter system. The battery 204, saddle 110, handlebars 108, front wheel 104, and rear wheel 106 are provided as detachable modules that can be attached to the body 102 or the chassis frame.

Figure 3:
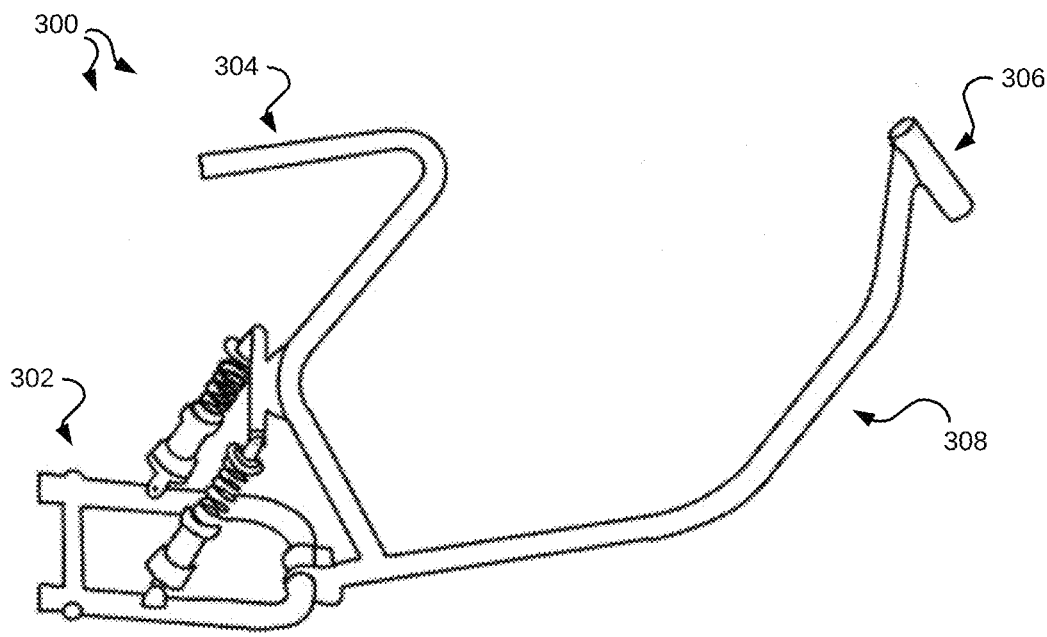
FIG. 3 shows an exemplary embodiment chassis frame component for use with the modular scooter shown in FIG. 1.

FIG. 3 shows an exemplary embodiment of a chassis frame component 300 for use with the scooter 100 shown in FIG. 1. The chassis frame 300 provides the main supporting structure of the scooter 100. In an embodiment, the chassis frame 300 comprises hollow metal tubes and serves as a skeleton onto which other components or modules are mounted. The chassis frame 300 also keeps the rear wheel 106 and the front wheel 104 in line to maintain the handling of the scooter. As illustrated in FIG. 3, the chassis frame 300 comprises rear wheel mounting features 302, saddle mounting feature 304, handlebar and front wheel mounting feature 306, and main frame component 308 onto which the scooter body 102 mounts.

Figure 4:
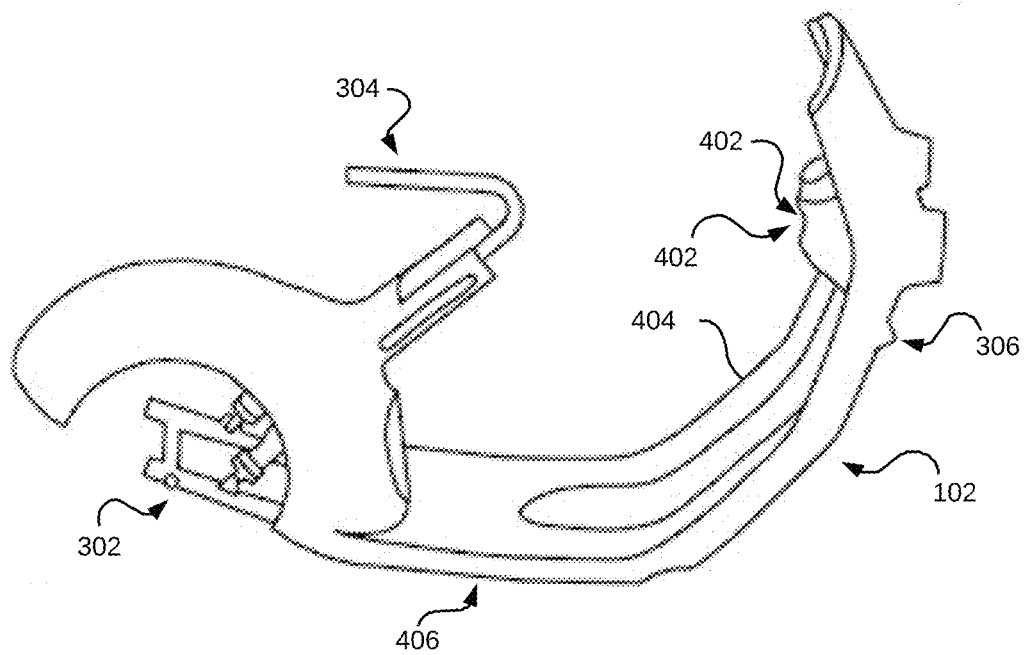
FIG. 4 shows an exemplary embodiment illustrating how the scooter body mounts to the chassis frame.

FIG. 4 shows an exemplary embodiment illustrating how the scooter body 102 mounts to the chassis frame 300. The chassis frame 300 is the main supporting structure of the scooter 100 onto which all other modular components are attached. As illustrated in FIG. 4, the scooter body 102 mounts to the main frame component 308 (not visible in FIG. 4). The rear wheel mounting features 302, saddle mounting feature 304, front wheel mounting feature 306 are visible in FIG. 4.

In an embodiment, the scooter body 102 houses the controller 202 (at mounting location 402) that sends signals to control the power output of the hub motor in the rear wheel when attached. In addition, the controller 202 supports other functions, such as general twist throttle, brake power-off, LCD meters and a variety of other functions of the scooter.

In an embodiment, the scooter body 102 is mounted on a relatively rigid main frame component 308 comprising tubular modules of high strength. The scooter body 102 also provides mounting location 404 to mount the battery 204. A second mounting location 406 is used to mount a second battery. The chassis frame 300 provides support and holds all the other modules of the scooter in place. The scooter body 102 houses the controller and is the master that delivers power to all the other modules and drives the communication. Each module responds to requests from the scooter body 102.

Figure 5:
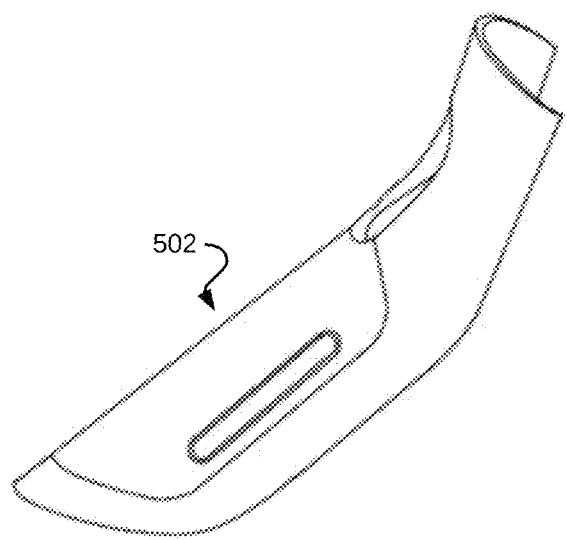
FIG. 5 shows an exemplary embodiment of a first battery for use with the modular scooter shown in FIG. 1.

FIG. 5 shows an exemplary embodiment of a first battery 502 for use with the modular scooter shown in FIG. 1. For example, the first battery 502 has a cylindrical shape and mounts to the scooter body 102 at location 404 shown in FIG. 4.

Figure 6:
FIG. 6 shows an exemplary embodiment of a second battery for use with the modular scooter shown in FIG. 1.

FIG. 6 shows an exemplary embodiment of a second battery 602 for use with the modular scooter shown in FIG. 1. For example, the second battery 602 has a linear shape. The scooter's modular layout defines the size and shape of the batteries. The batteries can be shaped as either a simple linear pack or having a cylindrical form as shown with respect to the first battery 502. The scooter body 102 provides mounting location 406 to mount the second battery 602.

Figure 7:
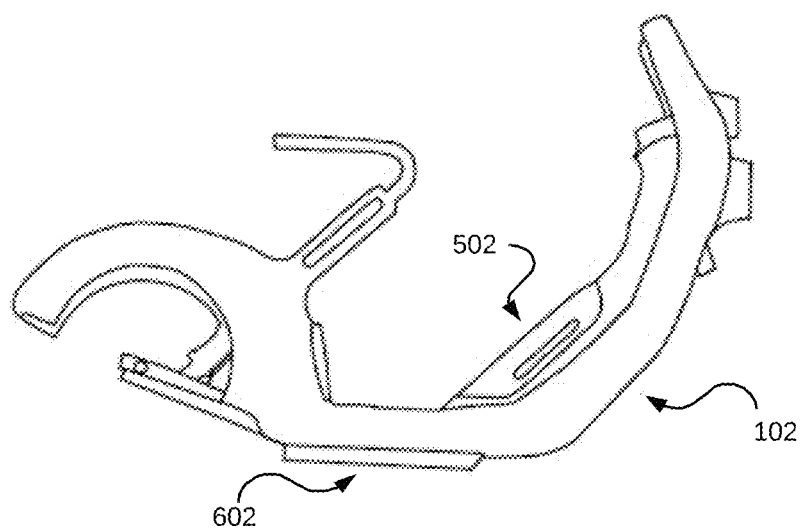
FIG. 7 shows an exemplary embodiment of the scooter body with the first and second batteries mounted for use with the modular scooter shown in FIG. 1.

FIG. 7 shows an exemplary embodiment illustrating how the first 502 and second 602 batteries are mounted on the scooter body 102 for use with the modular scooter 100 shown in FIG. 1. For example, the linear second battery 602 is mounted at the bottom of the scooter body 102 and the cylindrical first battery 502 is mounted as a downtube battery that is positioned on the frame by means of a mounting rail and is secured by a battery lock. In one embodiment, the batteries 502 and 602 can be charged while attached to the scooter body 102. In another embodiment each of the batteries 502 and 602 can charge the batteries, they can either be dismounted or charged while in place.

Figure 8:
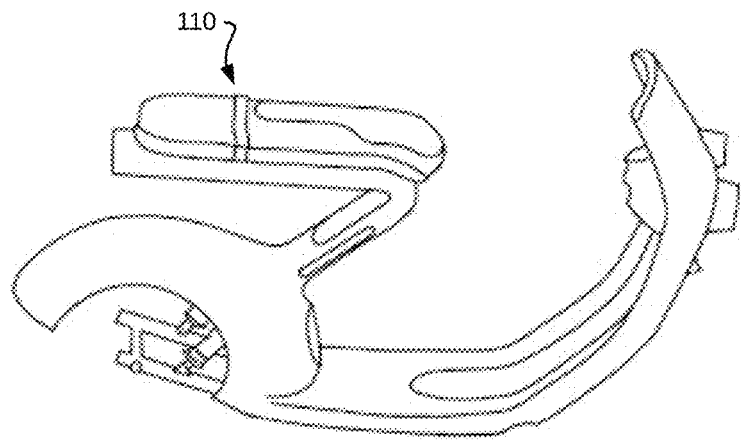
FIG. 8 shows an exemplary embodiment illustrating how a saddle mounts to the chassis frame.

FIG. 8 shows an exemplary embodiment illustrating how the saddle 110 mounts to the chassis frame 300. For example, the saddle 110 mounts to the saddle mounting feature 304 of the chassis frame 300.

Figure 9:
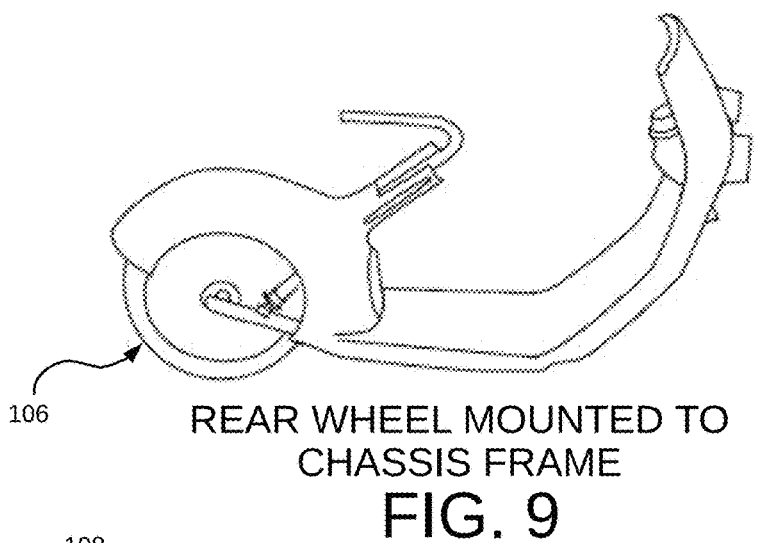
FIG. 9 shows an exemplary embodiment illustrating how a rear wheel mounts to the chassis frame.

FIG. 9 shows an exemplary embodiment illustrating how the rear wheel 106 mounts to the chassis frame 300. For example, the rear wheel 106 mounts to the rear wheel mounting features 302. In an embodiment, the rear wheel module 106 houses a hub motor that propels the scooter during operation.

Figure 10:
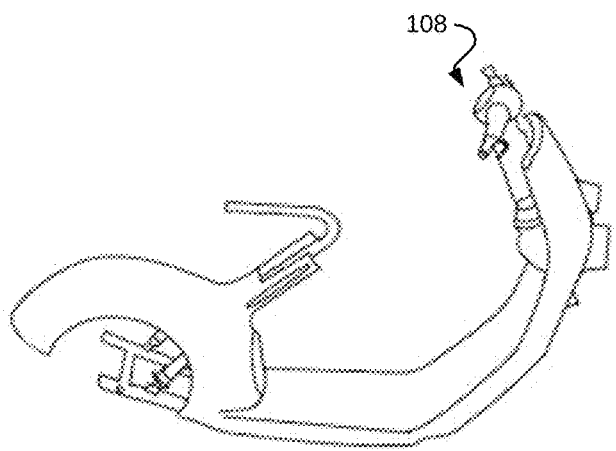
FIG. 10 shows an exemplary embodiment illustrating how handlebars mount to the chassis frame.

FIG. 10 shows an exemplary embodiment illustrating how the handlebar 108 (also referred to as a steering module) mounts to the chassis frame 300. For example, the handlebar 108 mounts to the handlebar and front wheel mounting feature 306.

Figure 11:
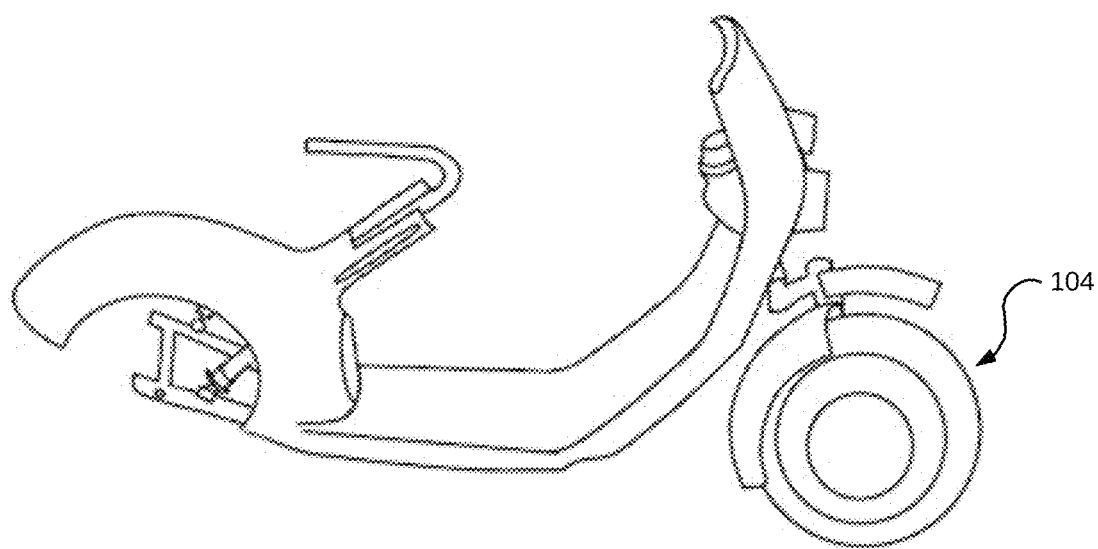
FIG. 11 shows an exemplary embodiment illustrating how a front wheel mounts to the chassis frame.

FIG. 11 shows an exemplary embodiment illustrating how the front wheel 104 mounts to the chassis frame 300. For example, the front wheel 104 mounts to the handlebar and front wheel mounting feature 306.

Figure 12:
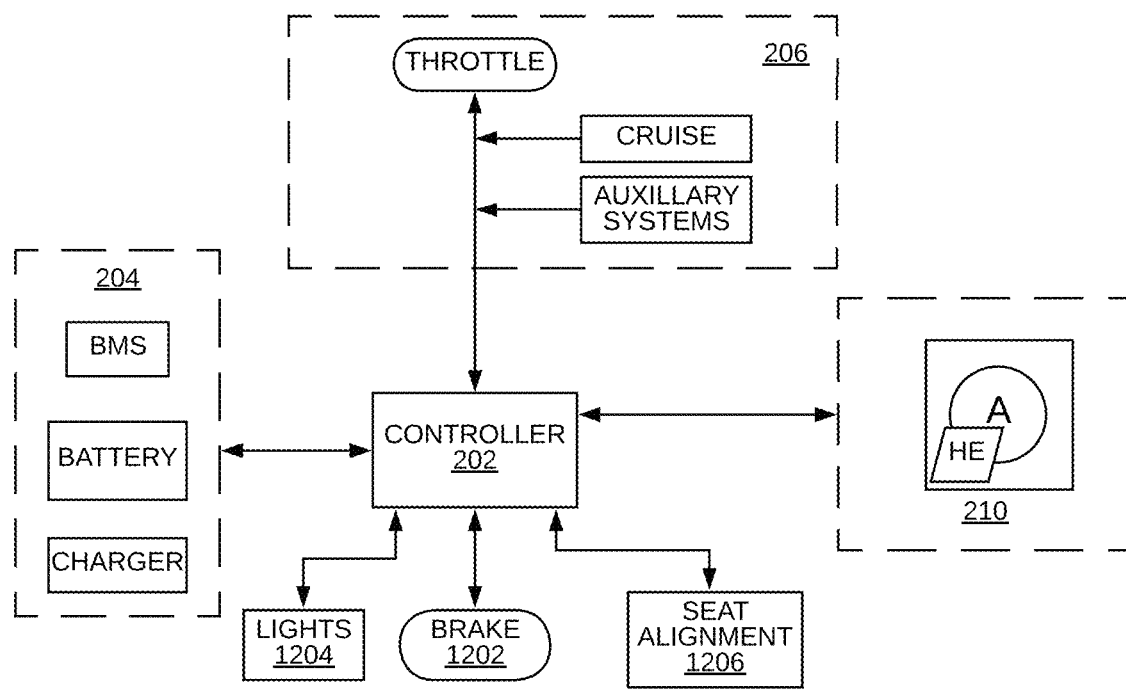
FIG. 12 shows a functional block diagram illustrating controller communications with a variety of scooter modules.

FIG. 12 shows a block diagram illustrating communication between the controller and other modules of the scooter 100. For example, the controller 202 communicates with the handlebar 206 to control functions of the throttle (e.g. cruise control) and auxiliary systems. The controller 202 also controls braking 1202, lights 1204, and motorized seat alignment 1206.

In various embodiments, the modules used in the scooter are used in an outdoor environment and may be exposed to water, humidity, salts, and road hazards, which can cause corrosion but most importantly, can cause severe damage to the electronics. The modules are configured to have a waterproof casing that enclose the electronics to waterproof the electric components for use in harsh environments.

In an embodiment, the modules have their own power source (e.g., batteries) and charging systems, such that the batteries have adequate capacity and rating to support the power specifications of each module on its own. An emergency system is incorporated in every module such that if the in-module batteries do not have adequate capacity to power the module, the module will request additional power from the rigid base, which is the power module of the whole system. The access to power for every module from the power module can be wired or wireless.

Figure 13:
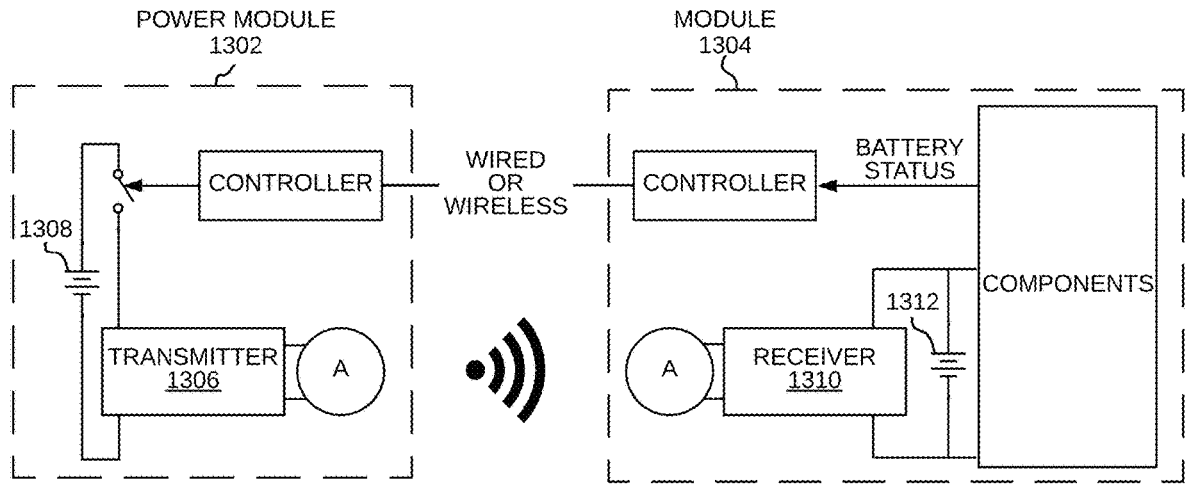
FIG. 13 shows an exemplary embodiment of a multiple battery scooter configuration.

FIG. 13 shows a diagram that illustrates a power module 1302 and a module 1304 in a multiple battery configuration. For example, a wireless power transmission system is provided. In this example, the power module 1302 in the rigid base has a transmitter device 1306 that transmits power from a main battery 1308 to a receiver device 1310 in the module 1304. The receiver device 1310 extracts the power from the field and charges the battery 1312 of the receiving module 1304. In another example, the power module 1302 contains a receiver device that extracts the power from the field and charges the main battery 1308.

Figure 14:
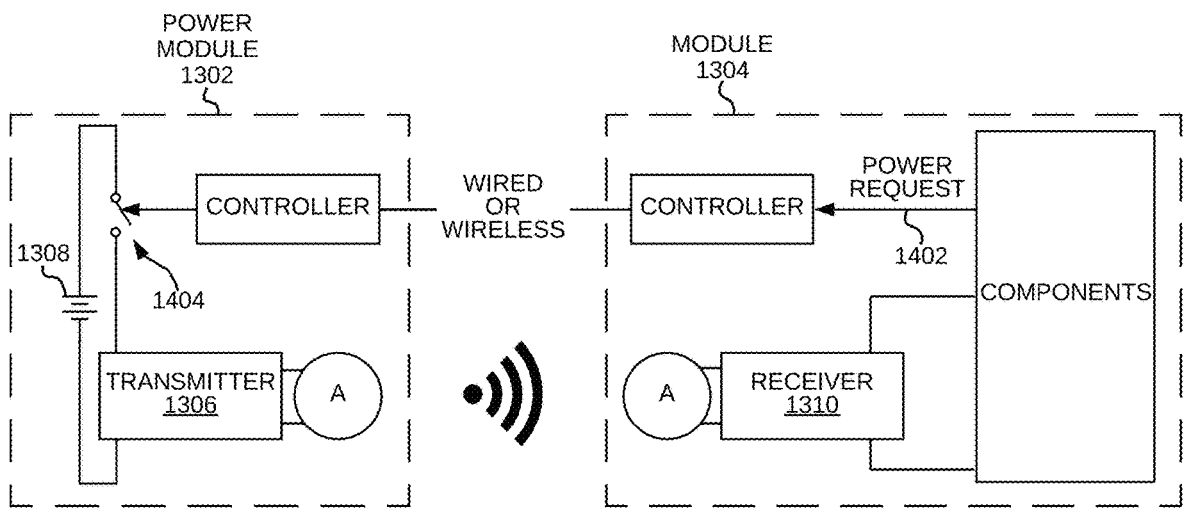
FIG. 14 shows an exemplary embodiment of a single battery scooter configuration.

FIG. 14 shows a diagram that illustrates the power module 1302 and a module 1304 in a single battery configuration. In this configuration, batteries are not present in every module. Each module uses extracted power by its receiver device 1308 to directly power the module rather than charging a module battery. For example, modules request power from the power module 1302, which provides the needed power to drive the components within the module 1304. In an embodiment, the module 1304 places a request 1402 for power to the power module 1302, which is acknowledged by turning ON a switch 1404 that enables power transmission to the module 1302. The module can also place a request 1402 to the power module 1302 to turn OFF the power, which is acknowledged by turning OFF the switch 1404.

In another embodiment, each module has connectors, where the power and ground line of the power house in the rigid base are connected to the power and ground line of the modules, which charges the module battery or powers the module directly.

Figure 15:
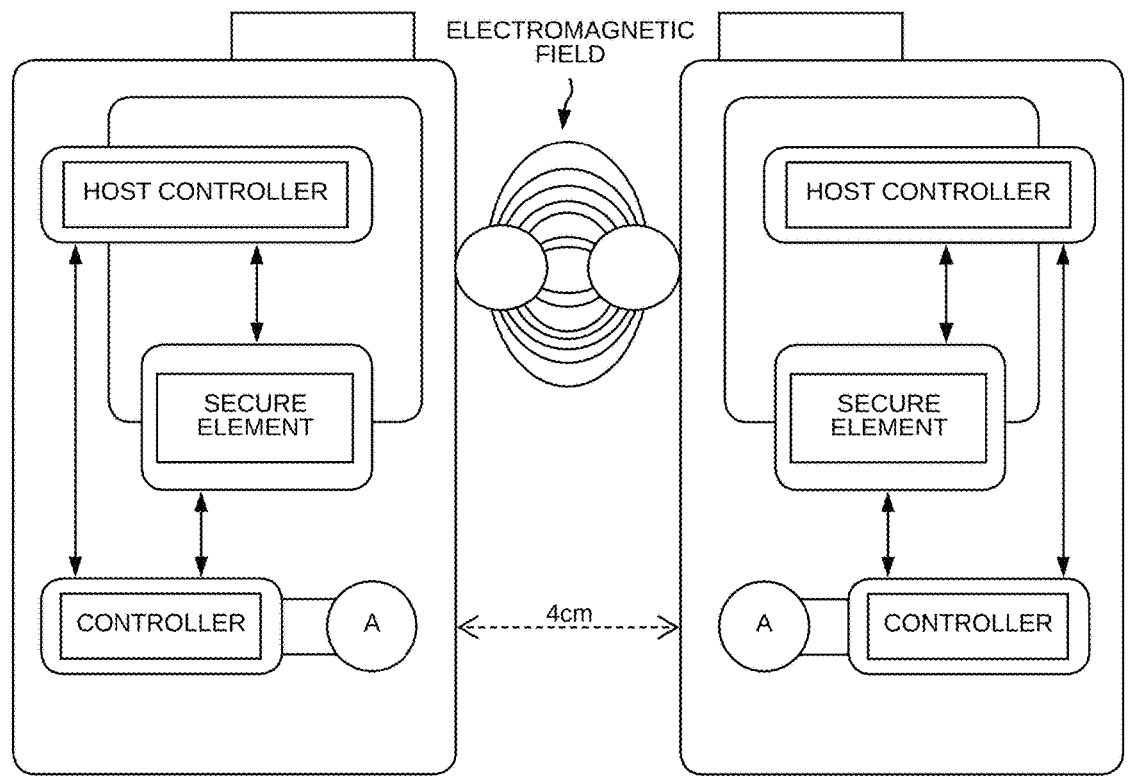
FIG. 15 shows a functional block diagram illustrating wireless data communications between scooter modules.

FIG. 15 shows a functional block diagram illustrating wireless data communications between scooter modules. For example, in an embodiment, wireless communication between control units (CU) of the modules is provided for sharing data and uses technologies in a wired mode, wireless mode, or a combination of both. The communication between the modules involves one or more various techniques or combinations of techniques. Wired connectors are used to allow the modules to communicate with each other using dedicated wires for high level bus protocols on which data is transmitted and interpreted. Wireless communication is used to allow modules to communicate when they are within the communication distances that can carry secure, two-way interactions between electronic devices in the modules. There are a number of different wireless technologies that may be used and each has its advantages and disadvantages.

In one embodiment, a method is used for uniquely identifying modules using radio wave communication. Since the empty distance between the modules is nearly zero, this method takes advantage of the short read range distances. In another embodiment, secure communication technology is used between modules as the modules are in very close proximity. The secure communication supports half duplex mode and read/write mode communication. In another embodiment, each module is designed to be a self-contained device that does not need other modules to function. The module comprises hardware and software that work together to run applications pertaining to that module. The module uses technologies and standards to demonstrate compliance in a stand-alone configuration.

In another embodiment, a communication controller is placed in every module so that when the modules are latched to each other during the final assembly process, the transmitter in each module is in proximity with the receiver in the other module within a range of a few centimeters. The control unit of a module that controls the module component functions transmits signals using the transmitter and receives signals using the receiver.

As shown in the embodiment of FIG. 15, the communication system comprises an antenna (A), a controller, a secure element (SE), and a host controller. The antenna enables the receiving and the transmitting of a signal. The controller modulates and demodulates the incoming and outgoing signal. The SE enables the components to run in a secure environment. The host controller is the heart of the module and controls overall operation.

Depending on the requirements, the two modules can be in full duplex or half duplex mode. In an embodiment, when both modules are in proximity with each other, there can be an exchange of data. The initiating module creates a radio magnetic (RM) field (electromagnetic field), and sends data or requests to the target module. The initiating module turns its RM field off and the target module creates an RM field to read the data. On the other hand, the target module sends data and turns an RM field off. In this way, half duplex transmission can be achieved. In another embodiment, the initiating module creates a RM field. The initiating module sends requests to the target module. The target module responds with the needed information.

The configurations for modular communication can be categorized into two sections as follows. In an embodiment, Near Field Communication (NFC) technology is used for communication between modules. However, communication between modules is not limited to this technology and can be extended to other appropriate wired and wireless technologies. More information describing module to module communication is provided with reference to FIG. 22.

The Rigid Base (Power House) is a removable battery module comprising one or more batteries capable of receiving and storing an electric charge within the removable battery module. The Rigid Base is capable of being removed from the scooter and can be charged via an A/C outlet. Every module has an in-house battery, which can be charged via an A/C outlet or through the Rigid Base (Power House). More information describing Rigid Base to module communication is provided with reference to FIG. 21.

Figure 16:
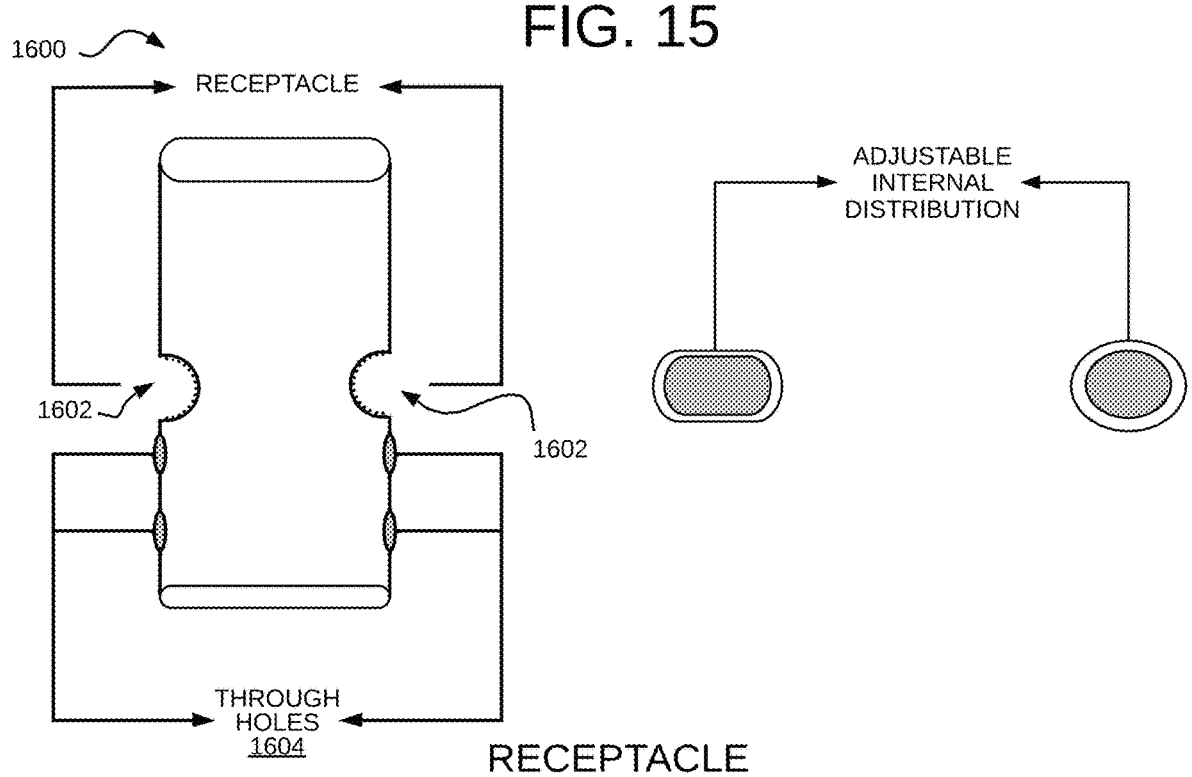
FIG. 16 shows an exemplary embodiment of a receptacle for use with the modular scooter shown in FIG. 1.

FIG. 16 shows an exemplary embodiment of a receptacle 1600 for use with the modular scooter shown in FIG. 1. The receptacle 1600 can be oval, circular, square, or rectangular or have any other suitable shape. The receptacle 1600 includes locking indentations 1602 and through holes or openings 1604 that are used to secure to a mating element.

Figure 17:
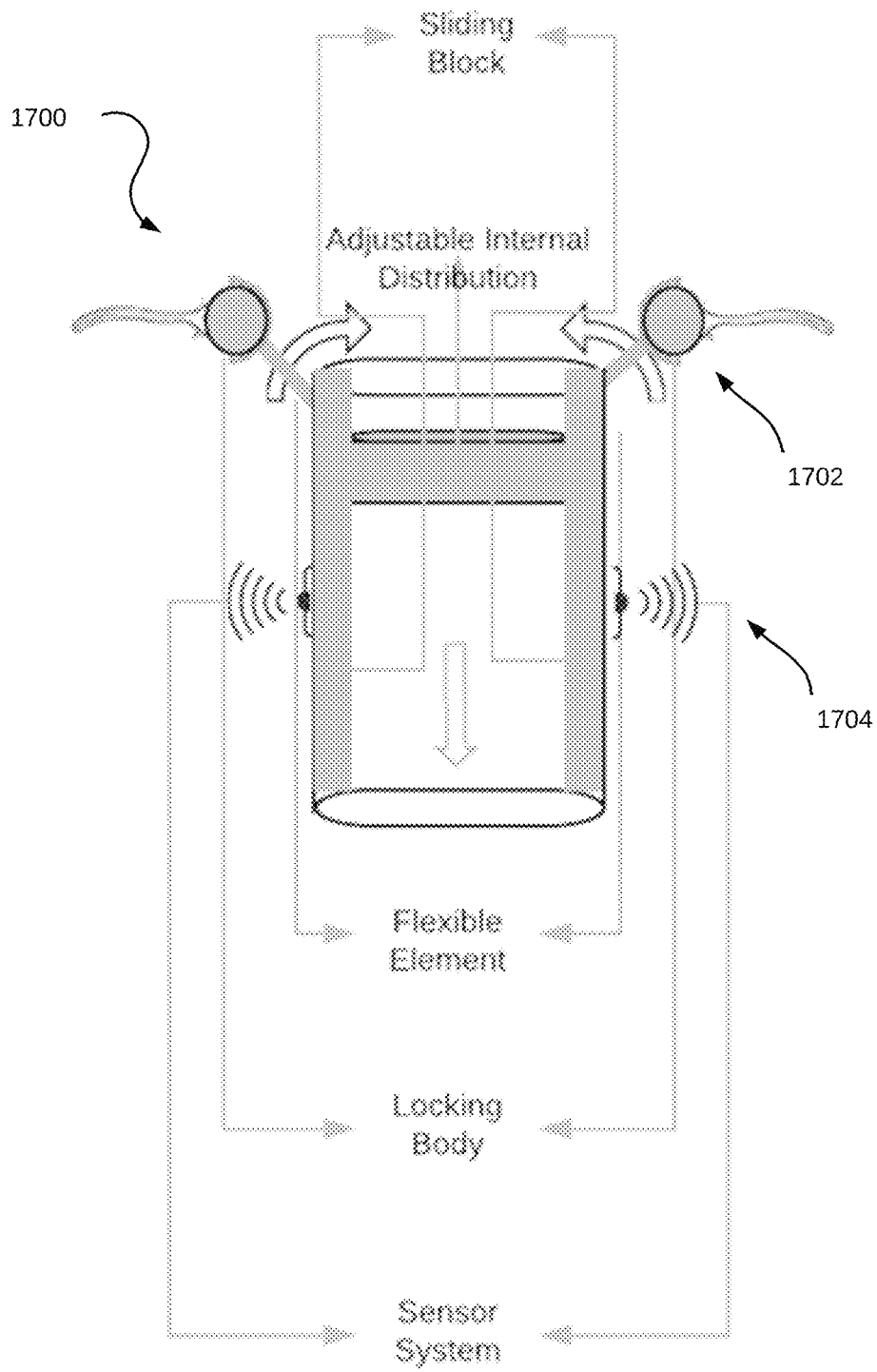
FIG. 17 shows an exemplary embodiment of a mating element that mates to a receptacle as illustrated in FIG. 16.

FIG. 17 shows an exemplary embodiment of a mating element 1700 that mates to a receptacle. For example, the mating element 1700 forms a flexible element having locking features 1702 and sensor system 1704 that can detect when proper attachment to the receptacle 1600 is achieved.

Figure 18:
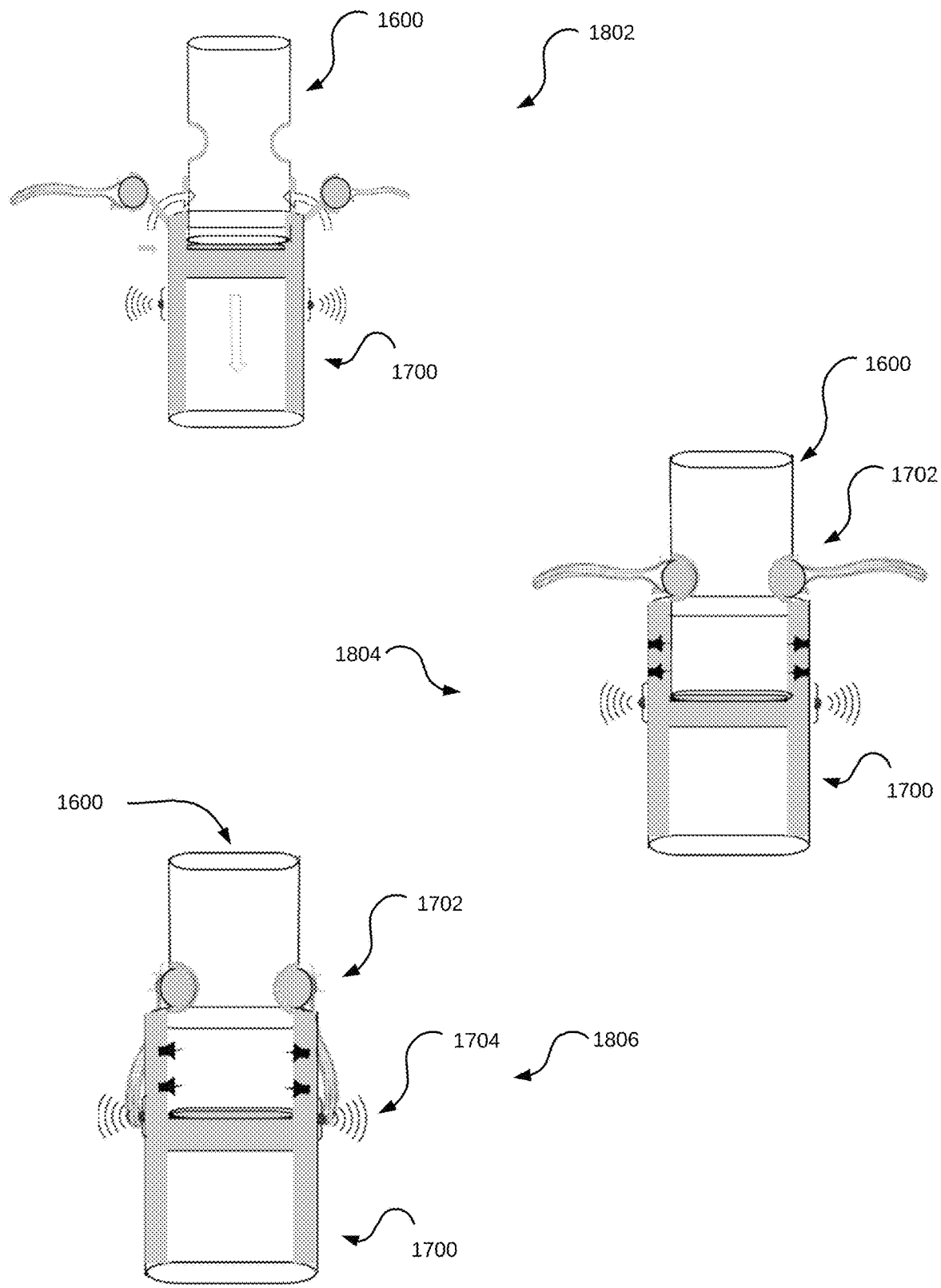
FIG. 18 shows exemplary embodiments illustrating receptacle operation.

FIG. 18 shows exemplary embodiments illustrating how a receptacle and mating element are attached. For example, as illustrated in the drawing 1802, the receptacle 1600 is inserted into the mating element 1700. As illustrated in the drawing 1804, the locking features 1702 locking into the indentations 1602 of the receptacle. As illustrated in the drawing 1806, the locking features 1702 are placed in the lock position to secure the receptacle 1600 to the mating element 1700. In the locking position, the locking features 1702 are detectable by the sensor system 1704 to enable detection of successful locking.

Figure 19:
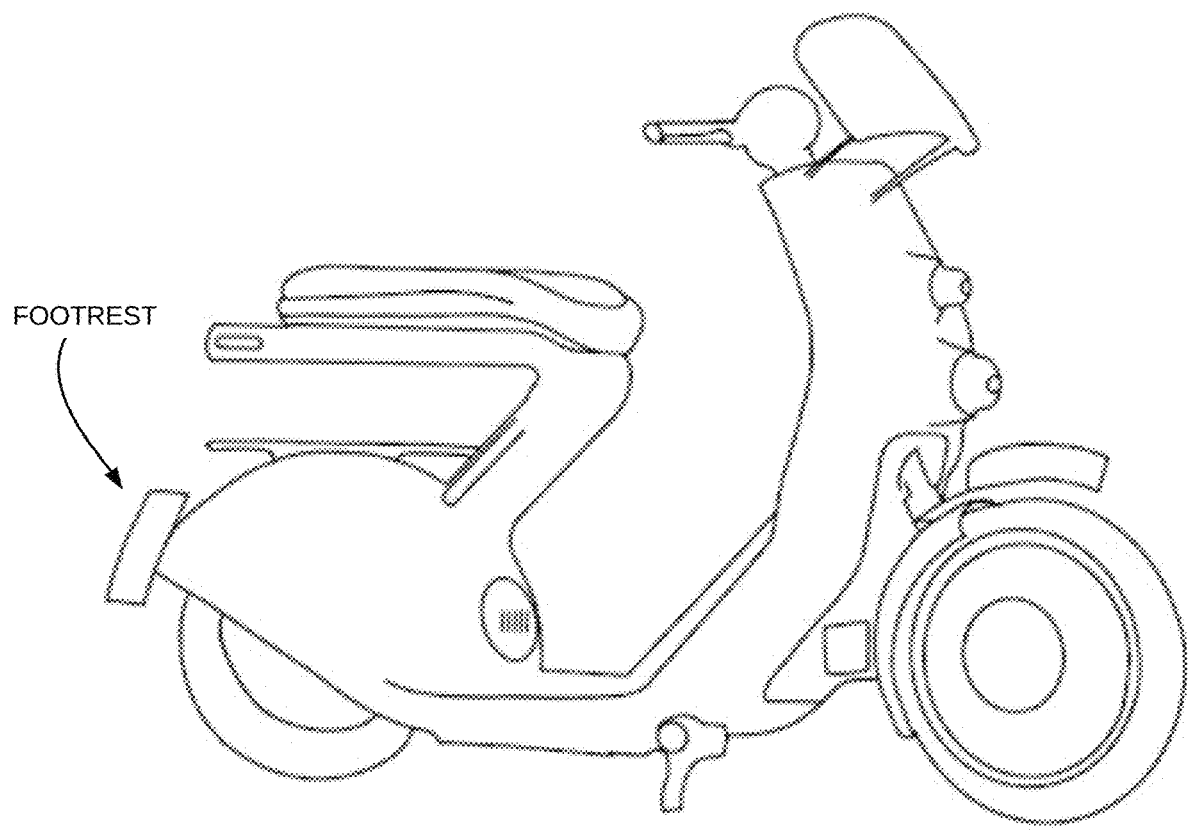
FIG. 19 shows an exemplary embodiment of a footrest mechanism for use with a scooter.

FIG. 19 shows an exemplary embodiment of a footrest mechanism for use with a scooter. In one embodiment, the footrest mechanism has a frame having an outside portion. The footrest mechanism comprises a footrest, a sidewall, one or more mounting slots, a footrest recess, a footrest assembly, a pivot bracket assembly, one or more support pegs, and a footrest device.

The footrest can be mounted on the outside of the frame. The sidewall has an outside portion. The mounting slots are formed through the sidewall of the frame. The footrest recess is formed on the outside of the sidewall of the frame. The footrest assembly can be attached to the frame. The pivot bracket assembly is attached to the frame and can be mounted in the mounting slot along the sidewall of the frame. The footrest device can be mounted on and pivoted with the support peg outside the mounting slot and is selectively retracted against the outside of the sidewall of the frame or extended and selectively held in the footrest recess.

In another embodiment, the footrest device is mounted detachably on the support peg and can be mounted on another slot to connect the footrest device to the support peg. The footrest device is designed so that it can also be mounted on multiple slots against the outside of the sidewall. The footrest mechanism exists on both sides of the scooter.

Figure 20:
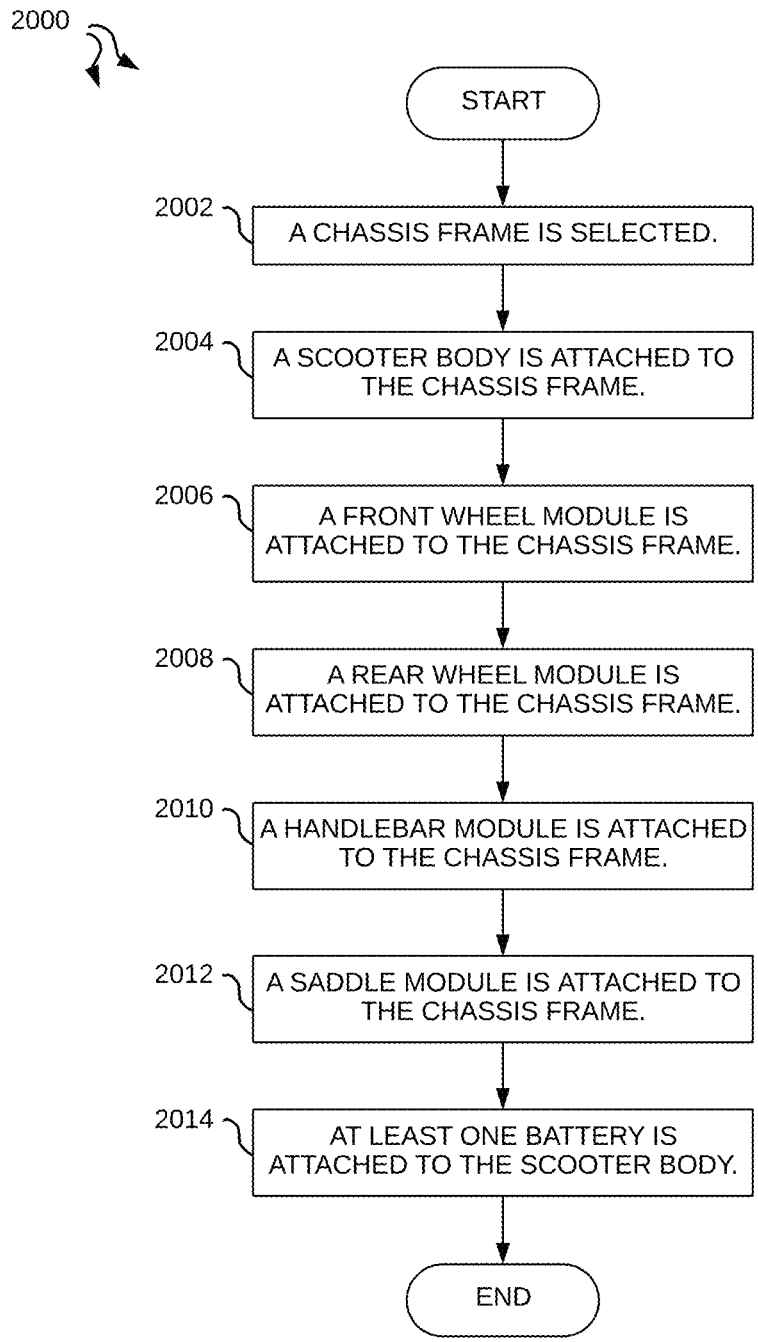
FIG. 20 shows an exemplary embodiment of a method for constructing a modular scooter.

FIG. 20 is a flowchart of a method 2000 for constructing a modular personal vehicle, such as the scooter 100 shown in FIG. 1. In a first step (step 2002), a chassis frame for the scooter is selected. For example, the chassis frame 300, is selected. In a second step (step 2004), a scooter body is attached to the chassis frame. For example, the scooter body 102 is attached to the chassis frame 300. In this example, the scooter body 102 includes a controller that controls overall operation of the modular personal vehicle. In a third step (step 2006), a front wheel module is attached to the chassis frame. For example, the front wheel module 104 is attached to the chassis frame 300. In a fourth step (step 2008), a rear wheel module is attached to the chassis frame. For example, the rear wheel module 106 is attached to the chassis frame 300. The rear wheel module includes a hub motor to propel the modular personal vehicle. In a fifth step (step 2010), a handlebar module is attached to the chassis frame. For example, the handlebar module 108 is attached to the chassis frame 300. The handlebar module 108 includes throttle and other controls to steer and operate the modular personal vehicle. In a sixth step (step 2012), a saddle module is attached to the chassis frame. For example, the saddle module 110 is attached to the chassis frame 300. In a seventh step (step 2014), at least one battery is attached to the scooter body. In one example, the battery 502 is attached to the scooter body 102. In another example, the battery 502 and the battery 602 are attached to the scooter body 102.

Figure 21:
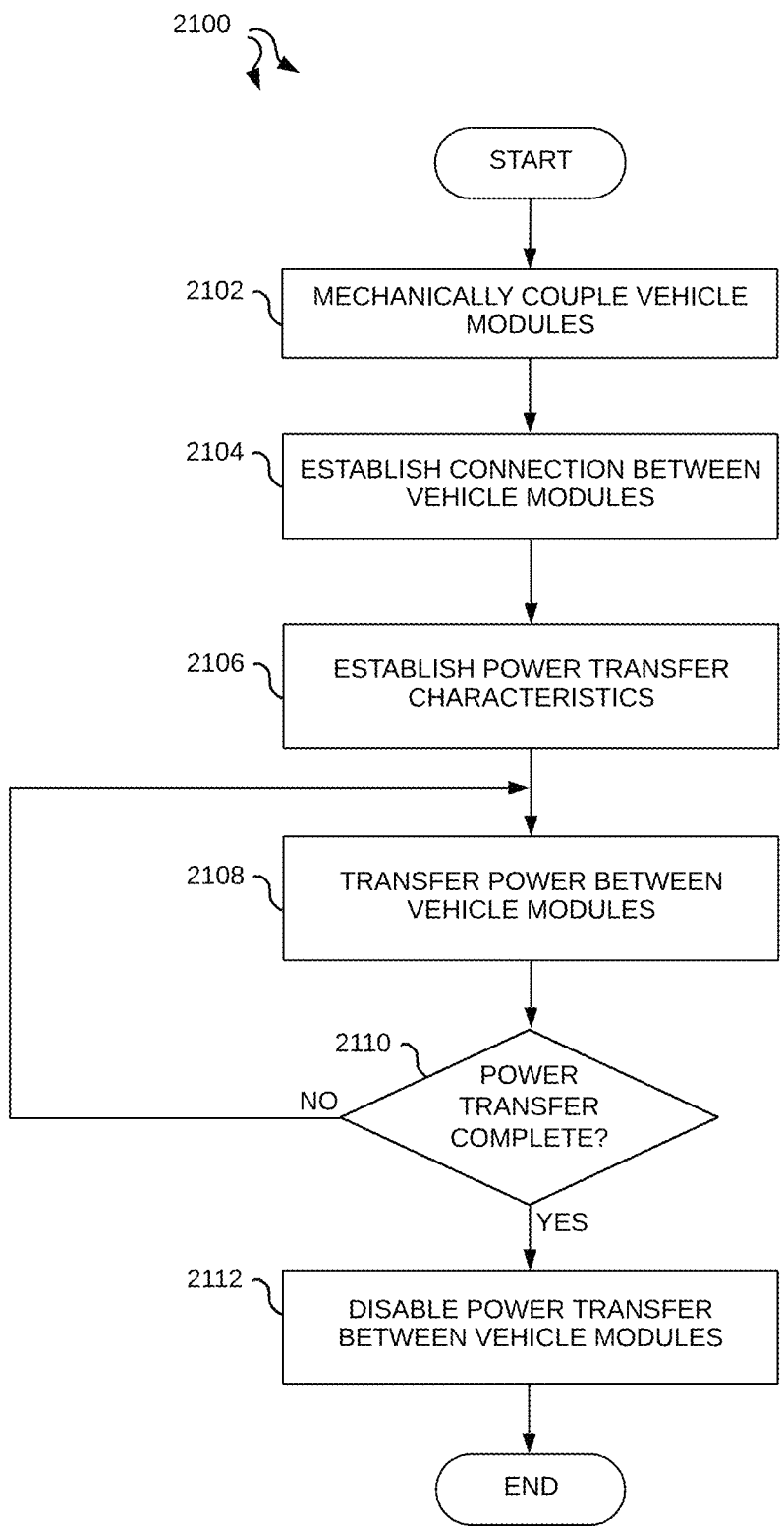
FIG. 21 shows an exemplary flow diagram for power house to module communication.

FIG. 21 is an exemplary flowchart for a method 2100 in accordance with one novel aspect. In a first step (step 2102), modules are mechanically coupled together. For example a first vehicle module is mechanically coupled to a second vehicle module. In a second step (step 2104), a connection is established between vehicle modules. For example, the second vehicle module establishes a wireless connection with the first vehicle module. In a third step (step 2106), power transfer characteristics are established. In a fourth step (step 2108), power is transferred between vehicle modules. For example, the first vehicle module wirelessly transfers power to the second vehicle module. In another example, the second vehicle module transfers power to the first vehicle module via a wired connection. In a fifth step (step 2110), power is transferred between vehicle modules until the power transfer is complete. In a sixth step (step 2112), power transfer between vehicle modules is disabled.

Figure 22:
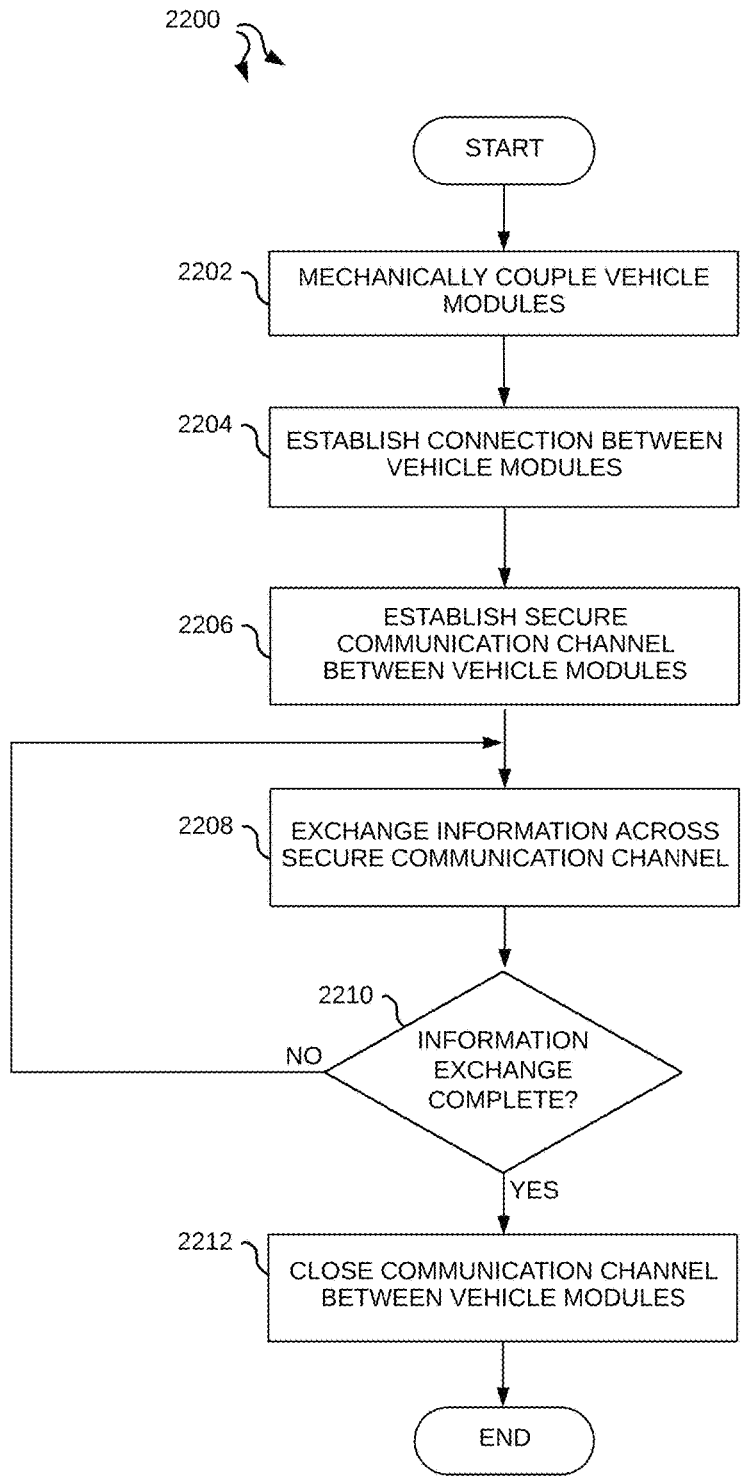
FIG. 22 shows an exemplary flow diagram for module to module communication.

FIG. 22 shows an exemplary flow chart for a method 2200 in accordance with another novel aspect. In a first step (step 2202), vehicle modules are mechanically coupled. For example a second vehicle module is mechanically coupled to a first vehicle module. In a second step (step 2204), a connection is established between vehicle modules. For example, the first vehicle module establishes a wireless connection with the second vehicle module. In another example, the second vehicle module establishes a wired connection with the first vehicle module. In a third step (step 2206), a secure communication channel is established between vehicle modules. In a fourth step (step 2208), information is exchanged across a secure communication channel. For example, the first vehicle module wirelessly exchanges information with the second vehicle module. In another example, the second vehicle module exchanges information with the first vehicle module via a wired connection. In a fifth step (step 2210), information is transferred between vehicle modules until the information transfer is complete. In a sixth step (step 2212), the communication channel between vehicle modules is closed. For additional information on the methods 2100 and 2200, including how to construct and operate systems that can perform methods 2100 and 2200, see: U.S. Provisional Patent Application Ser. No. 62/912,636, entitled "Personal Vehicle Having Quick Detachable Modules And Wireless Communication Between Modules," filed on Oct. 8, 2019.

Figure 23:
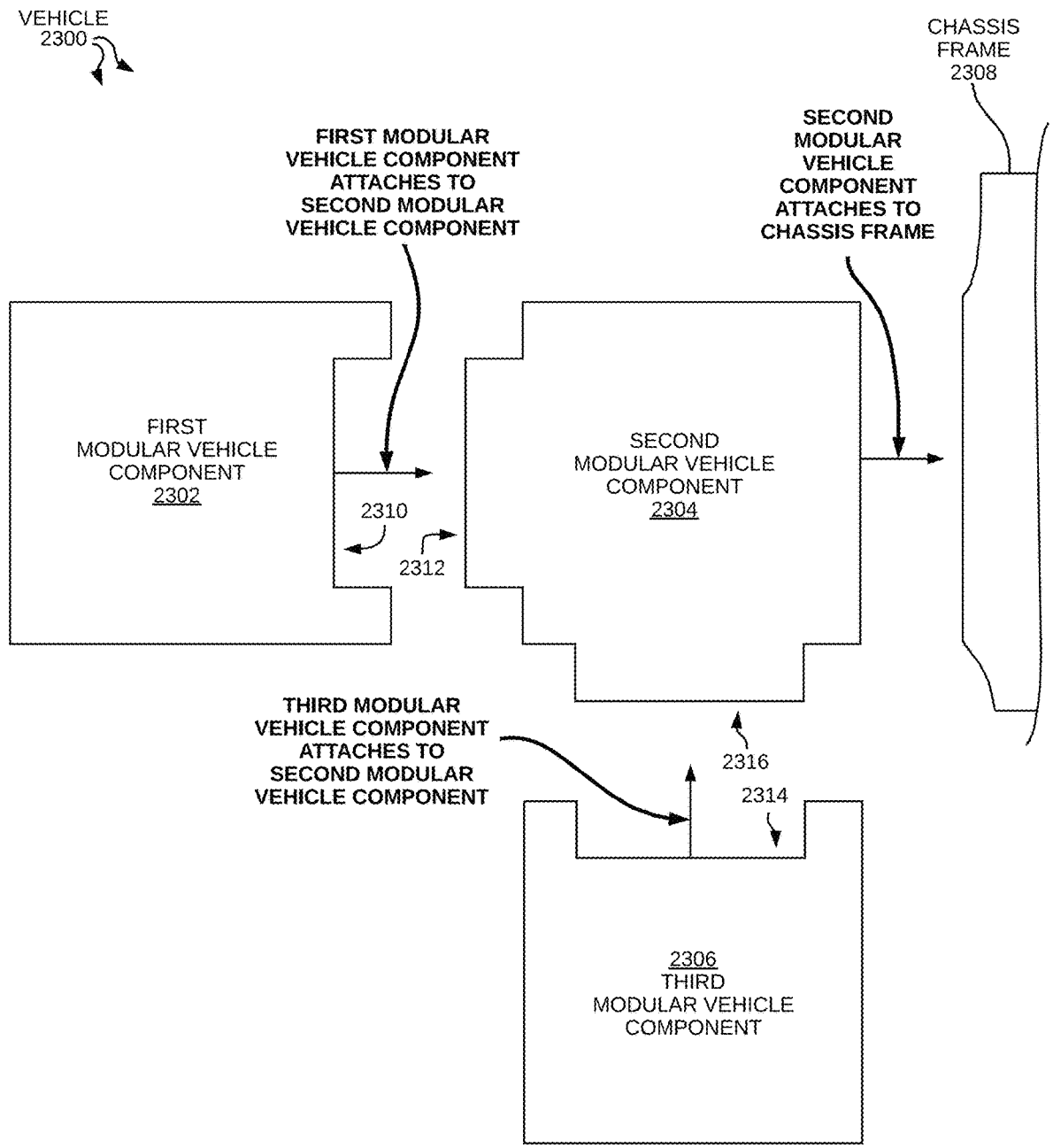
FIG. 23 is a diagram of modular vehicle components of a modular vehicle 2300 prior to assembly.

FIG. 23 is a diagram of modular vehicle components of a modular vehicle 2300 prior to assembly. In the example shown in FIG. 23, the modular vehicle 2300 includes a first modular vehicle component 2302, a second modular vehicle component 2304, a third modular vehicle component 2306, and a chassis frame 2308. The first modular vehicle component 2302 includes vehicle module coupler 2310 that is configured to couple to a first vehicle module coupler 2312 of the second modular vehicle component 2304. The third module component 2306 includes vehicle module coupler 2314 that is configured to couple to a second vehicle module coupler 2316 of the second module component 2304. In another example, the vehicle module couplers 2310, 2312, 2314, and 2316 are configured in different ways to attach to each other. Furthermore, FIG. 23 illustrates one example of the modular vehicle components shown in FIG. 1.

Figure 24:
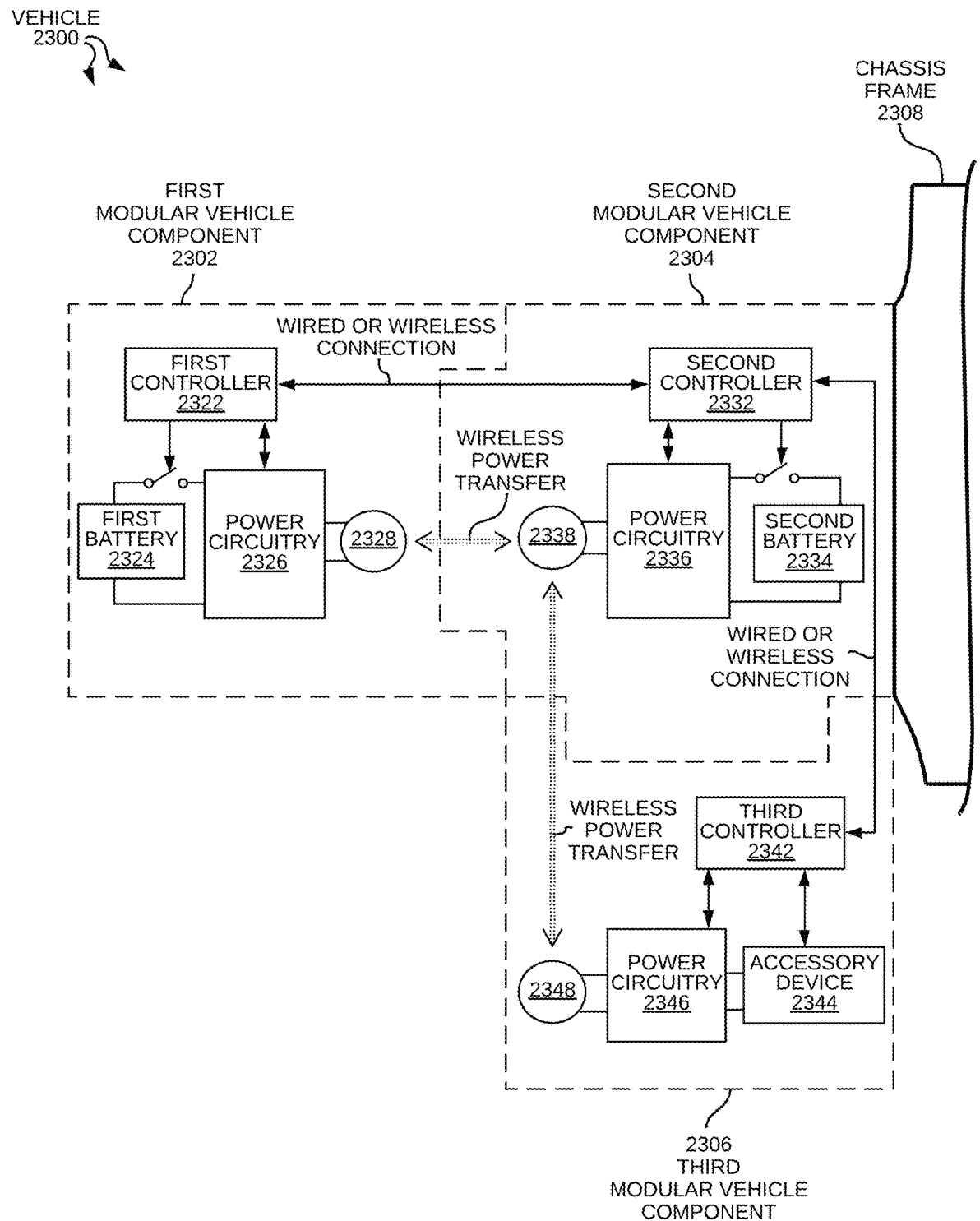
FIG. 24 is a diagram of modular vehicle components of the modular vehicle 2300 after assembly.

FIG. 24 is a diagram of modular vehicle components of the modular vehicle 2300 after assembly. The example of FIG. 24 shows the first modular vehicle component 2302 including a first controller 2322, a first battery 2324, power circuitry 2326, and an antenna 2328. The second modular vehicle component 2304, includes a second controller 2332, a second battery 2334, power circuitry 2336, and an antenna 2338. The third modular vehicle component 2306, includes a third controller 2342, an accessory device 2344, power circuitry 2346, an antenna 2348. In this example, the second modular vehicle component 2304 is attached to chassis frame 2308. In another example, similar to FIG. 1, the modular vehicle components 2302, 2304, and 2306 are each attached to the chassis frame 2308.

The modular vehicle components are attached to each other by manual interlocking systems, by self locking mechanisms, or by a combination of both. In manual interlocking systems, techniques are used to connect floating modules by utilizing a male-female interlocking arrangement of connector bodies which manually lock and unlock allowing quick and easy connecting and disconnecting of the modules. In self-locking interlocking systems, techniques are used to connect floating modules using a self locking auxiliary block for attachment of modules and a releasable engagement with a matable receiving surface. In addition, self-locking interlocking systems also include methods to monitor the locked or unlocked status of each module by sensing in the locked position. In addition, the system generates alerts when a lock is moved from the locked position without authorization.

Figure 25:
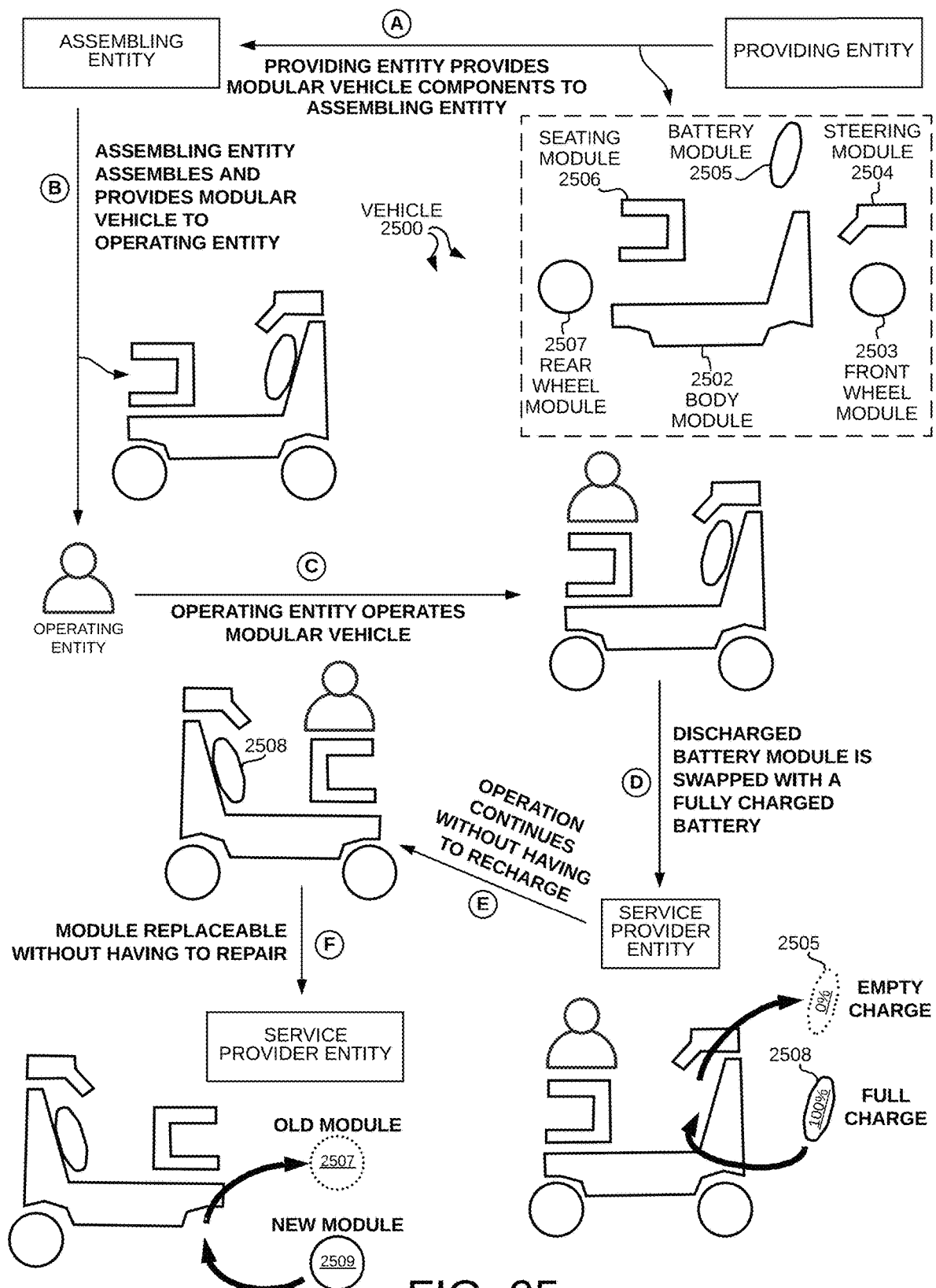
FIG. 25 is a diagram showing various benefits of a novel modular vehicle in accordance with at least one embodiment.

FIG. 25 is a diagram showing various benefits of a novel modular vehicle in accordance with at least one embodiment. In a first step (Step A), a providing entity, also referred to as a manufacturing entity, manufactures and provides vehicle modules to an assembling entity. In this example, the vehicle modules are assembled into a module scooter vehicle 2500. The vehicle modules include a body module 2502, a front wheel module 2503, a steering module 2504, a battery module 2505, a seating module 2506, and a rear wheel module 2507. Each of the front wheel module 2503, the steering module 2504, the battery module 2505, the seating module 2506, and the rear wheel module 2507 is attachable to the body module 2502 via manual interlocking mechanisms, self locking mechanisms, or by a combination of both as described above. Once attached, each module is operable to exchange information or power between at least one other module.

In a second step (Step B), the assembling entity assembles the vehicle modules into a modular vehicle 2500 and provides the modular vehicle 2500 to an operating entity. The operating entity is to use the modular vehicle 2500 as a form of transportation. In one embodiment, the providing entity and the assembling entity are the same entity. In another embodiment, the providing entity and the assembling entity are separate entities.

In a third step (Step C), the operating entity operates the modular vehicle. For example, the operating entity uses the modular scooter vehicle 2500 to conduct daily transportation activities, such as commuting to and from work. During the commute, the battery module 2505 is discharged. In one example, the operating entity stops at a charge station, plugs the battery module 2505 into a charger, and waits for the battery module 2505 to fully recharge. In another example, the operating entity stops at a service provider entity facility and exchanges the depleted battery module 2505 with a fully charged battery.

In a fourth step (Step D), the discharged battery module is swapped with a fully charged battery module 2508. The modular characteristics of the modular vehicle 2500 yields this significant technological improvement where the operating entity only needs to swap the battery module at a service provider entity facility without having to wait for a recharge cycle. In one example, the service provider entity charges a flat fee or subscription fee for this battery exchange service. In one embodiment, the assembling entity and the service provider entity are the same entity. In another embodiment, the assembling entity and the service provider entity are separate entities.

In a fifth step (Step E), the operating entity continues operating the modular vehicle 2500 without stopping and waiting to recharge. The operating entity continues operating until the modular vehicle 2500 requires recharging or repair.

In a sixth step (Step F), a module 2507 of the modular vehicle 2500 is replaced with a new module 2509. The modular characteristics of the modular vehicle 2500 yields this additional significant technological improvement in which no repair is required to maintain the modular vehicle 2500. The service provider entity replaces the damaged or used module with a new module resulting in quick and efficient serving. These novel techniques leverage economies of scale in that the providing entity can mass produce various modules and provide them to various entities at low costs. Repairs or replacement costs are significantly reduced and no time is wasted on awaiting repairs or replacement components as with conventional vehicles.

Although certain specific embodiments are described above for instructional purposes, the teachings of this patent document have general applicability and are not limited to the specific embodiments described above. The function of the hardware circuitry illustrated in the figures can be implemented in hardware circuitry as shown, or in a combination of dedicated hardware circuitry and software, or largely in software. Accordingly, various modifications, adaptations, and combinations of various features of the described embodiments can be practiced without departing from the scope of the invention as set forth in the claims.

What is claimed is:

1. A vehicle comprising:
a chassis frame;
a first modular vehicle component; and
a second modular vehicle component, wherein the first modular vehicle component and the second modular vehicle component are components of the same vehicle wherein the first modular vehicle component attaches to the second modular vehicle component, wherein operating information is exchanged between the first modular vehicle component and the second modular vehicle component, and wherein power is wirelessly exchanged between the first modular vehicle component and the second modular vehicle component.

2. The vehicle of claim 1, further comprising:
a third modular vehicle component having an accessory device, wherein the first modular vehicle component, the second modular vehicle component, and the third modular vehicle component are components of the same vehicle, wherein the third modular vehicle component attaches to the second modular vehicle component, and wherein the second modular vehicle component controls operation of the accessory device via a wired or wireless connection.

3. The vehicle of claim 2, wherein energy stored in the first modular vehicle component is used to supply the third modular vehicle component.

4. The vehicle of claim 2, wherein the second modular vehicle component requests power from the first modular vehicle component based on power requirements of the third modular vehicle component.

5. The vehicle of claim 2, wherein the second modular vehicle component is attached to the chassis frame, wherein the first modular vehicle component is detachably coupled to the second modular vehicle component, wherein the third modular vehicle component is attached to the second modular vehicle component.

6. The vehicle of claim 2, wherein the accessory device is an electric motor, and wherein the second modular vehicle component controls operation of the electric motor based on user input.

7. The vehicle of claim 1, wherein the second modular vehicle component is attached to the chassis frame.

8. The vehicle of claim 1, wherein the second modular vehicle component authenticates the first modular vehicle component via key exchange communications, and wherein the second modular vehicle component communicates with the first modular vehicle component only if authentication is successful.

9. The vehicle of claim 1, wherein operating information is exchanged between the first modular vehicle component and the second modular vehicle component via a wired or wireless connection.

10. The vehicle of claim 1, wherein the first modular vehicle component comprises a first controller, a first battery, and a first vehicle module coupler, wherein the second modular vehicle component comprises a second controller, a second battery, and a second vehicle module coupler, and wherein the first modular vehicle component couples to the second modular vehicle component by coupling the first vehicle module coupler to the second vehicle module coupler.

11. The vehicle of claim 10, wherein operating information is exchanged between the first controller and the second controller via a secure communication channel, and wherein electrical energy is wirelessly transferred between the first battery and the second battery.

12. The vehicle of claim 10, wherein the first modular vehicle component further comprises a first enclosure, wherein the first controller is disposed within the first enclosure, wherein the first vehicle module coupler is disposed on the first enclosure, wherein the second modular vehicle component further comprises a second enclosure, wherein the second controller is disposed within the second enclosure, and wherein the second vehicle module coupler is disposed on the second enclosure.

13. A method comprising:
forming a first vehicle module; and
forming a second vehicle module, wherein the second vehicle module is attachable to a vehicle frame, wherein the first vehicle module is attachable and detachable to the second vehicle module, wherein the first vehicle module and the second vehicle modules are modules of the same vehicle, wherein when the first vehicle module is attached to the second vehicle module, operating information is transferred between the first vehicle module and the second vehicle module, and wherein when the first vehicle module is attached to the second vehicle module, power is wirelessly transferred between the first vehicle module and the second vehicle module.

14. The method of claim 13, wherein the forming is performed by a manufacturing entity, and wherein the method further comprises:
providing the first vehicle module and the second vehicle module to an assembling entity that attaches the first vehicle module to the second vehicle module.

15. The method of claim 13, wherein the vehicle is operated by an operating entity, wherein the vehicle has at least one vehicle module that is interchangeable with a third vehicle module by the operating entity, wherein the vehicle has at least one vehicle module that is interchangeable with a fourth vehicle module by a service providing entity, and wherein the vehicle is operable with the third vehicle module and the fourth vehicle module installed on the vehicle.

16. The method of claim 13, wherein the first vehicle module includes a battery, wherein the vehicle includes a vehicle module having a motor, and wherein when the battery of the first vehicle module is depleted, the first vehicle module is removed from the vehicle, provided to a charging entity that exchanges the first vehicle module with a third vehicle module having a fully charged battery, and the third vehicle module is attached to the second vehicle module.

17. The method of claim 13, further comprising:
forming a third vehicle module having an accessory device, wherein the third vehicle module attaches to the second vehicle module, and wherein the second vehicle module controls operation of the accessory device via a wired or wireless connection.

18. The method of claim 17, wherein energy stored in the first vehicle module is used to supply the accessory device of the third vehicle module, and wherein the second vehicle module controls operation of the accessory device in response to user input.

19. A system comprising:
a first vehicle module having a battery; and
means for detachably coupling to the first vehicle module, wherein the means is also for communicating operating information with the first vehicle module, wherein the means is also for wirelessly transferring power with the battery of a second vehicle module, and wherein the means is attached to a vehicle chassis.

20. The system of claim 19, wherein the means is a vehicle module having an enclosure, a vehicle module coupler, a controller, power circuitry, and a coil, wherein the detachably coupling involves the vehicle module coupler mating with part of the first vehicle module, wherein the communicating involves the controller sending to and receiving data from the first vehicle module, and wherein the wirelessly transferring power involves the power circuitry and coil magnetically coupling to the first vehicle module.

* * * * *